US007693899B2

(12) United States Patent
Ireland et al.

(10) Patent No.: US 7,693,899 B2
(45) Date of Patent: Apr. 6, 2010

(54) METHOD, SYSTEM, AND COMPUTER PROGRAM PRODUCT FOR CONSTRUCTING A QUERY WITH A GRAPHICAL USER INTERFACE

(75) Inventors: Scott Ireland, Silver Spring, MD (US); Yuri Gaidoukevitch, Leiderdorp (NL)

(73) Assignee: Media Cybernetics, Inc., Silver Springs, MD (US)

( * ) Notice: Subject to any disclaimer, the term of this patent is extended or adjusted under 35 U.S.C. 154(b) by 363 days.

(21) Appl. No.: 10/975,184

(22) Filed: Oct. 28, 2004

(65) Prior Publication Data
US 2005/0125399 A1 Jun. 9, 2005

Related U.S. Application Data (60) Provisional application No. 60/514,686, filed on Oct. 28, 2003.

(51) Int. Cl.
G06F 7/00 (2006.01)
G06F 17/30 (2006.01)

(52) U.S. Cl. ........................................ 707/713; 707/915

(58) Field of Classification Search ............... 707/1–10, 707/100–104.1, 200–206; 715/762–765
See application file for complete search history.

(56) References Cited

U.S. PATENT DOCUMENTS

| | | | |
|---|---|---|---|
| 2,612,994 A | 10/1952 | Woodland et al. | |
| 5,422,674 A | 6/1995 | Hooper et al. | |
| 5,493,638 A | 2/1996 | Hooper et al. | |
| 5,588,149 A * | 12/1996 | Hirose | 707/1 |
| 5,644,765 A * | 7/1997 | Shimura et al. | 707/104.1 |
| 5,710,899 A * | 1/1998 | Eick | 715/764 |
| 5,911,139 A * | 6/1999 | Jain et al. | 707/3 |
| 5,956,422 A | 9/1999 | Alam | |
| 6,345,274 B1 * | 2/2002 | Zhu et al. | 707/5 |
| 6,418,430 B1 * | 7/2002 | DeFazio et al. | 707/3 |
| 6,873,430 B2 | 3/2003 | Grasso et al. | |
| 6,568,596 B1 | 5/2003 | Shaw | |
| 6,615,141 B1 | 9/2003 | Sabry et al. | |
| 6,629,104 B1 | 9/2003 | Parulski et al. | |
| 6,631,331 B1 | 10/2003 | Sabry et al. | |
| 6,892,255 B2 | 5/2005 | Teshima | |

(Continued)

OTHER PUBLICATIONS

Swain., Searching for multimedia on the World Wide Web, Jun. 7-11, 1999, IEEE, vol. 1, 32-37.*

(Continued)

*Primary Examiner*—Jean B Fleurantin
(74) *Attorney, Agent, or Firm*—Caesar, Rivise, Bernstein, Cohen & Pokotilow, Ltd.

(57) ABSTRACT

A feature of at least one object from a first computer database is selected with a graphical user interface. The feature is characterized by a value. The feature can be selected from a table in which the feature is represented as a field in the table. A subrange of values of the feature is selected with the graphical user interface from a graph of a range of values of the feature. The graph can be a histogram, a scatter plot, or the like. The query is constructed so that it can identify an object from at least one of the first computer database and a second computer database if the value of the feature of the object is within the subrange of values.

32 Claims, 7 Drawing Sheets

U.S. PATENT DOCUMENTS

| | | | |
|---|---|---|---|
| 6,925,597 | B2 | 8/2005 | Anwar |
| 6,961,482 | B2 | 11/2005 | Knowles |
| 2002/0064759 | A1 | 5/2002 | Durbin |
| 2002/0069218 | A1 | 6/2002 | Sull |

OTHER PUBLICATIONS

Zhao et al., A 3-D robust range feature extraction tool for industrial automation applications, Oct. 23-26, 1995, IEEE, vol. 3, 45-48.*

Lombardi, Victor "NBS Metadata Glossary" [online], 9 pages, Retrieved from http://www.noisebetweenstations.com/personal/essays/metadata_ glossary May 2003 [Retrieved on Oct. 13, 2004].

"dret's XML and Web Service Glossary: Meta Data" [online] p. 1, Retrieved from http://dret.net/glossary/metadata [Retrieved on Oct. 13, 2004].

"Glossary: metadata" [online], 1 page, Retrieved from http://www.-106.ibm.com/developerworks/patterns/glossary/metadata.html [Retrieved on Oct. 13, 2004].

MediaCybernetics, "IQBase: Revolutionary Intelligence for Image Informatics", 6 pages, 2003, Silver Spring, MD.

Fast Objects, Bartels, Dick, et al. "A Comparison Between Relational and Object-Oriented Database Systems for Object-Oriented Application Development" pp. 1-13, 2001.

Fast Objects, Schwieger, Michael. "Getting Started with FastObjects by Poet- A Step by Step JDO Tutorial" pp. 1-19, Sep. 5, 2003.

"Object Oriented Database Systems" [online], 1 page, Retrieved from http://fria.utc.sk/~kmat/dbs/oodbs/OODBS.htm [Retrieved on Oct. 21, 1003].

"What is Inheritance" [online], 2 pages, Retrieved from http://fria.utc.ski/~kmat/dbs/oodbs/inheritance.htm [Retrieved on Oct. 21, 2003].

"What are Messages" [online], 2 pages, Retrieved from http://fria.utc.sk/~kmat/dbs/oodbs/messages.htm [Retrieved on Oct. 21, 2003].

"What are Classes" [online], 3 pages, Retrieved from http://fria.utc.sk/~kmat/dbs/oodbs/class.htm [Retrieved on Oct. 21, 2003].

"Object-Oriented Data Model" [online], 2 pages, Retrieved from http://fria.utc.sk/~kmat/dbs/oodbs/OODBS1b.htm [Retrieved on Oct. 21, 2003].

"Evolution of the Database Technology" [online], 3 pages, Retrieved from http://fria.utc.sk/~kmat/dbs/oodbs/OODBS 1a.htm [Retrieved on Oct. 21, 2003].

"IQbase—Features" [online], 4 pages, Retrieved from http://www.mediacy.com/iqbase/iqbasefeatures.htm [Retrieved on Oct. 20, 2003].

"IQbase image database- archive, manage, and extract knowledge from images", [online], 2 pages, Retrieved from http://www.mediacy.com/iqbase/iqbase.htm [Retrieved on Oct. 20, 2003].

"Graphical User Interface Timeline" [online] 21 pages, Retrieved from http://toastytech.com/guis/guitimeline2.html [Retrieved on Oct. 16, 2003].

"Database Terminology" [online], 4 pages, Retrieved from http://soba.fortlewis/edu/lsc/csis350-f01/terminology.html [Retrieved on Oct. 22, 2003].

"IQbase- Features | Screenshots: Intelligent Archiving" [online] 3 pages, Retrieved from http://mediacy.com/iqbase/iqbasefeatures.htm [Retrieved on Oct. 18, 2004].

"IQ Studio Features" [online] 2 pages, Retrieved from http://mediacy.com/iqs/iqsfeatures.htm [Retrieved on Oct. 18, 2004].

"IQ Imaging Development Forum" [online] 2 pages, Retrieved from http://mediacy.com/forum_intro.htm [Retrieved on Oct. 18, 2004].

"Media Cybernetics | Image Informatics | Image Analysts | From Images to Answers" [online] 1 page, Retrieved from http://mediacy.com/ [Retrieved on Oct. 18, 2004].

"Image Informatics | Image Database | IQbase" [online], 2 pages, Retrieved from http://mediacy.com/iqbase/iqbase.htm [Retrieved on Oct. 18, 2004].

"Document- a Whatis.com definition" [online] 3 pages, Retrieved from http://whatis.techtarget.com/definition/0..sid9_gci211982,00.html [Retrieved on Oct. 24, 2004].

"File- a Whatis.com definition" [online] 3 pages, Retrieved from http://searchexchange.techtarget.com/sDefinition/0..sid43_gci212118.00.html [Retrieved on Oct. 14, 2004].

"Image Pro Plus" [online] 6 pages, Retrieved from http://mediacy.com/ipp/ippfeatures.htm [Retrieved on Oct. 18, 2004].

National Library of Australia, Cathro, Dr. Warwick, "Metadata: an Overview" [online] pp. 1-9, Retrieved from http://www.nla.gov.au/nla/staffpaper/cathro3.html [Retrieved on Oct. 24, 2004].

NOAA Coastal Services Center, "What is Metadata" [online], 1 page, Retrieved from http://www.cdc.noaa.gov/metadata/ [Retrieved on Oct. 24, 2004].

"Metadata: Definition" [online] 1 page, Retrieved from http://www.w3.org/People/EM/talks/www7/tutorial/part2/tsld003.htm [Retrieved on Oct.24, 2004].

"Metadata Education: What is metadata?" [online] 4 pages, Retrieved from http://www.sdvc.uwyo.edu/metadata/what.html [Retrieved on Oct. 24, 2004].

"Glossary: FGDC metadata content Standard" [online] 6 pages, Retrieved from http://geology.usgs.gov/tools/metadata/standard/glossary.html [Retrieved on Oct. 13, 2004].

Wason, Thomas D., "Glossary for Metadata, Taxonomies, & Digital Libraries" [online] 7 pages, Retrieved from http://wason.home.mindspring.com/TDW/Glossary.htm [Retrieved on Oct. 13, 2004].

"Google Search: define: Thumbnail" [online] 3 pages, Retrieved from http://www.google.com/search?h1=en&lr=&oi=defmore&q=define:Thumbnail [Retrieved on Oct. 13, 2004] .

"FastObjects, Inc.- High Performance Made Simple—Provider of JDO databases, Java databases and C++ databases." [online] 1 page, Retrieved from http://www.fastobjects.com/us/ [Retrieved on Oct. 20, 2003].

"FastObjects, Inc.—Developer Infortmation—White Papers" [online] 2 pages, Retrieved from http://www.fastobjects.com/us/FastObjects_DeveloperInfo_WhitePapers.asp [Retrieved on Oct. 20, 2003].

"McDBLib—Database Engine"[online] 6 pages, Retrieved from http://www.mediacy.com/iqs/documentx/McDBLib%20Overview.htm [Retrieved on Jan. 16, 2008].

* cited by examiner

| 702 | SELECT, WITH A GRAPHICAL USER INTERFACE, A SET FROM A FIRST COMPUTER DATABASE, THE SET HAVING AT LEAST ONE OBJECT |

| 704 | SELECT, WITH THE GRAPHICAL USER INTERFACE, A FEATURE OF THE AT LEAST ONE OBJECT FROM THE FIRST COMPUTER DATABASE, WHEREIN THE FEATURE CAN BE CHARACTERIZED BY A VALUE |

| 706 | SELECT, WITH THE GRAPHICAL USER INTERFACE, A SUBRANGE OF VALUES OF THE FEATURE FROM A GRAPH OF A RANGE OF VALUES OF THE FEATURE |

| 708 | CONSTRUCT THE QUERY SO THAT IT IS CAPABLE OF IDENTIFYING AN OBJECT FROM AT LEAST ONE OF THE FIRST COMPUTER DATABASE AND A SECOND COMPUTER DATABASE IF THE VALUE OF THE FEATURE OF THE OBJECT IS WITHIN THE SUBRANGE OF VALUES |

| 710 | DISPLAY A REPRESENTATION OF THE QUERY, THE REPRESENTATION HAVING THE FEATURE AND THE SUBRANGE OF VALUES |

| 712 | REVISE THE QUERY |

| 714 | SAVE THE QUERY |

| 716 | EXECUTE THE QUERY |

| 718 | DISPLAY THE OBJECT |

| 720 | SAVE THE OBJECT |

METHOD, SYSTEM, AND COMPUTER PROGRAM PRODUCT FOR CONSTRUCTING A QUERY WITH A GRAPHICAL USER INTERFACE

CROSS-REFERENCE TO RELATED APPLICATIONS

This application claims the benefit of U.S. Provisional Application No. 60/514,686, filed Oct. 28, 2003, which is incorporated herein in its entirety by reference.

BACKGROUND OF THE INVENTION

1. Field of the Invention

The present invention relates to computer databases.

2. Related Art

A query causes a set of objects from a computer database to be presented. A query can be defined in terms of a feature associated with the set and/or a range of values associated with the feature. When the set is associated with more than one feature, Boolean algebra expressions can be used to indicate the relationships among the features. As database technology has evolved, query languages have been developed to allow a user to construct a query. Furthermore, a user interface can be used so that the user can construct the query without specific knowledge of the underlying query language. Typically, a graphical user interface can be used to construct a simple query. However, a character user interface is often necessary to construct a more complex query. This is particularly the case when the user interface supports queries of a computer database in which a set of objects can have more than one feature, in which the values associated with any one feature can reside within a range of values. To construct such queries, a character user interface is often used to select a subrange of values of the feature. Typically, the lower and upper limits of the subrange are keyed into the query via the character user interface. What is needed is a graphical user interface that can construct queries for a computer database in which a set of objects can have more than one feature, in which the values associated with any one feature can reside within a range of values.

SUMMARY OF THE INVENTION

The present invention relates to computer databases. In an embodiment, the present invention comprises a method for constructing a query. A feature of at least one object from a first computer database is selected with a graphical user interface. The feature is characterized by a value. Optionally, the value is a measurement. The feature can be selected from a table in which the feature is represented as a field in the table. A subrange of values of the feature is selected with the graphical user interface from a graph of a range of values of the feature. The graph can be a histogram, a scatter plot, or the like. The query is constructed so that it can identify an object from at least one of the first computer database and a second computer database if the value of the feature of the object is within the subrange of values.

The object can be a file. The file can comprise an image. The file can further comprise a set of features related to the image. The set of features can include the selected feature. The file can further comprise a user-defined feature related to the image. The user-defined feature can be the selected feature.

A set from the first computer database can be selected with the graphical user interface. The set has the at least one object. The set can be selected from a display of the first computer database in which the set is represented as a folder. The folder can be displayed in a hierarchical arrangement of folders. The set can be selected from a display of the first computer database in which the set is represented as a table. An object of the set can be represented as a record in the table.

A representation of the query can be displayed. The representation can have the feature and the subrange of values. The query can be revised. The query can be saved. The query can be executed. The object can be saved or the address of a memory location in which the object is stored can be saved. The saved object can be a set of objects. The saved object can be identified by the selected feature. The saved object can be represented as a folder. The folder can be displayed in a hierarchical arrangement of folders.

In another embodiment, the present invention comprises a system for constructing a query. The system comprises a graphical user interface, a processor, and a memory. The graphical user interface has a selector and a display device. The selector allows a user to select a feature of at least one object from a first computer database and a subrange of values of the feature from a graph of a range of values of the feature. The graph can be a histogram, a scatter plot, or the like. The feature is characterized by a value. The display device is coupled to the selector. The display device displays the feature and the subrange of values. The processor is coupled to the graphical user interface. The processor is configured to construct the query. The query can identify an object from at least one of the first computer database and a second computer database if the value of the feature of the object is within the subrange of values. The object can be a file. The file can comprise an image. The memory is coupled to the processor. The memory stores the first computer database and the second computer database.

The graphical user interface can further comprise an interaction device. The interaction device can be coupled to the selector. The interaction device can allow the user to define a second feature related to the image. The interaction device can also allow the user to revise the query.

The selector can allow the user to select a set from the first computer database. The set has the at least one object. The set can be represented as a folder. The folder can be displayed in a hierarchical arrangement of folders. The set can be represented as a table. An object of the set can be represented as a record in the table. The selector can also allow the user to select the feature from a table in which the feature is represented as a field in the table.

The display device can display. The display device can also display a representation of the query. The representation can have the feature and the subrange of values. The display device can display the object.

The processor can save the query to the memory. The processor can execute the query. The processor can also save the object to the memory or save an address of a location in the memory in which the object is stored. The object can be a set of objects. The object can be identified by the feature. The object can be represented as a folder. The folder can be displayed in a hierarchical arrangement of folders.

In yet another embodiment, the present invention comprises a computer program product for constructing a query. The computer program product has computer program code means embodied in a computer useable medium. The computer program code means comprises a first computer program code means, a second computer program code means, and a third computer program code means.

The first program code means allows the user to select, with a graphical user interface, a feature of at least one object from a first computer database. The feature can be characterized by a value. The feature can be selected from a table in which the feature is represented as a field in the table. The computer program product can further comprise a fourth program means for allowing the user to define a second feature related to the image. The value can be a measurement.

The second program code means allows the user to select, with the graphical user interface, a subrange of values of the feature from a graph of a range of values of the feature. The graphic can be a histogram, a scatter plot, or the like.

The third program code means causes a processor to construct the query. The query can identify an object from at least one of the first computer database and a second computer database if the value of the feature of the object is within the subrange of values. The object can be a file. The file can comprise an image. The file can further comprises a set of features related to the image.

The computer program product can also comprise a further program means for allowing the user to select, with the graphical user interface, a set from the first computer database. The set has the at least one object. The set can be represented as a folder. The folder can be displayed in a hierarchical arrangement of folders. The set can be represented as a table. An object of the set can be represented as a record in the table.

The computer program product can also comprise a further program means for displaying a representation of the query. The representation can have the feature and the subrange of values. The computer program product can further comprise a fourth program means for allowing the user to revise the query. The computer program product can further comprise a fourth program means for causing the processor to save the query to a memory.

The computer program product can also comprise a further program means for causing the processor to execute the query. The computer program product can also comprise a still further program means for displaying the object. The computer program product can also comprise means for causing the processor to save the object to a memory or to save an address of a location in the memory in which the object is stored. The object can be a set of objects. The object can be identified by the feature. The object can be represented as a folder. The folder can be displayed in a hierarchical arrangement of folders.

Further embodiments, features, and advantages of the present invention, as well as the structure and operation of the various embodiments of the present invention, are described in detail below with reference to the accompanying drawings. Each feature or advantage is not necessarily required for all embodiments of the present invention.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The preferred embodiments of the invention are described with reference to the figures where like reference numbers indicate identical or functionally similar elements. Also in the figures, the left most digit(s) of each reference number identifies the figure in which the reference number is first used.

DETAILED DESCRIPTION OF THE PREFERRED EMBODIMENTS

Overview

Figure 1:
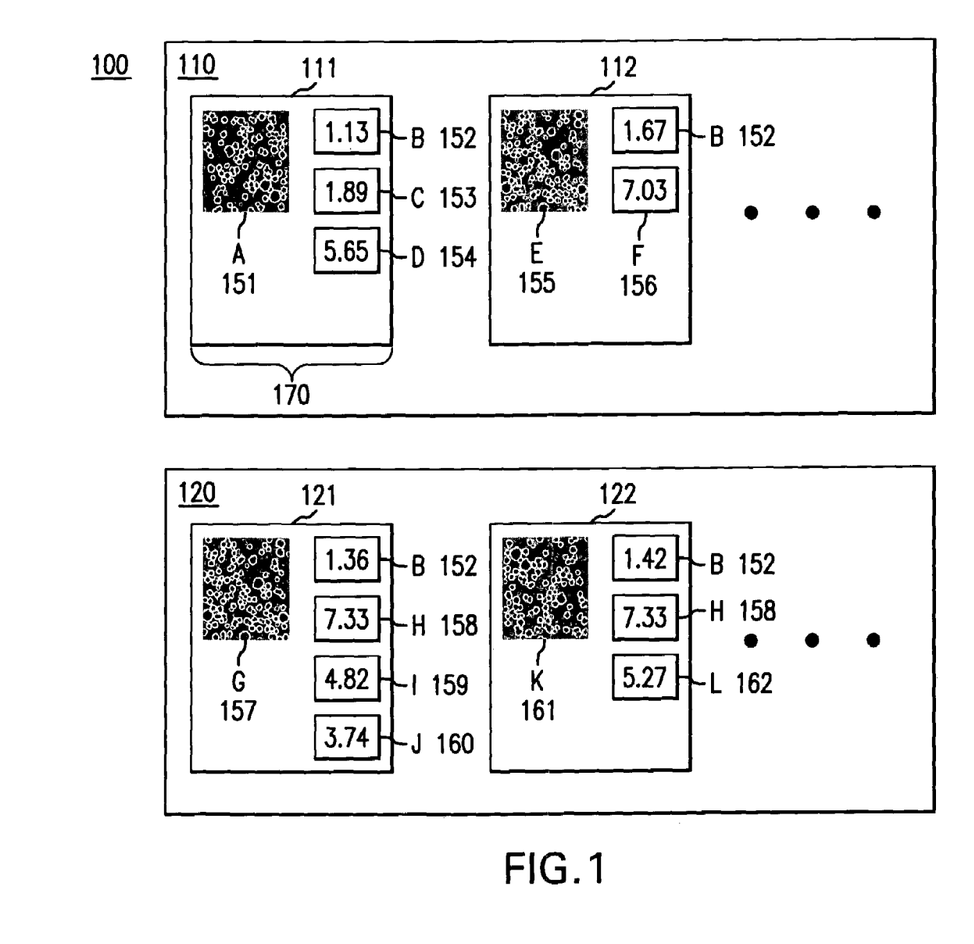
FIG. 1 illustrates an exemplary computer database environment 100 in which the present invention can be implemented.

The present invention relates to computer databases. FIG. 1 illustrates an exemplary computer database environment 100 in which the present invention can be implemented. Environment 100 comprises, for example, a plurality of computer databases including a first computer database 110 and a second computer database 120. First computer database 110 comprises a plurality of objects including a first object 111 and a second object 112. Likewise, second computer database comprises a plurality of objects including a third object 121 and a fourth object 122. Each object is a software bundle of related variables. For example, first object 111 has variables A 151, B 152, C 153, and D 154; second object 112 has variables E 155, B 152, and F 156; third object 121 has variables G 157, B 152, H 158, I 159, and J 160; and fourth object 122 has variables K 161, B 152, H 158, and L 162.

In an embodiment, variables A 151, E 155, G 157, and K 161 can each be a file, an image, or the like. The remaining variables in each object can be features associated with the corresponding file or image of the object (e.g., metadata). The features can be extracted using computer processed algorithms, derived using user-operated computer graphics tools, or both. Extracted features can include, but are not limited to, signature, thumbnail, and other image attributes; file signature and other file related attributes; grain sizing and other material analysis; edge detection and analysis; image feature counting and analysis; histograms; and line profiles. These can be obtained using digital image processing methods such as, but not limited to, background subtraction, thresholding, smoothing, adaptive filtering, edge enhancements, contrast enhancements, and histogram equalizations. These methods are well known to those of skill in the art. User-derived features can include, but are not limited to, manual measurements (e.g., distances, angles, etc.) of portions of subject(s) in the image, textual overlay annotations, Boolean values (e.g., true or false) assigned by the user, etc. Some of these can be obtained with the assistance of overlay templates. The computer processed algorithms and user-operated computer graphics tools used to extract features from images are incorporated in, for example, the Image-Pro® and IQstudio™ families of products offered by Media Cybernetics Inc. of Silver Spring, Md., U.S.A.

The present invention provides a graphical user interface that can construct queries for a computer database in which a set of objects can have more than one feature and in which the values associated with any one feature can reside within a range of values. Generally, a graphical user interface is a system comprising hardware, software, firmware, or any combination thereof that allows a user to interface with a computer via its display system. Characteristics of a graphical user interface can include, but are not limited to, a bit-mapped display, an Ethernet® network for transferring data and commands, an optical cursor control device (e.g., mouse, trackball, stylus, touch pad, touch screen, or the like), windowed display of operations, icon-initiated programs, and menus for programming options. A graphical user interface is distinguishable from a character user interface (e.g., keyboard). Apple® Macintosh® and Microsoft® Windows™, for example, are applications of graphical user interfaces that can provide a basis for the graphical user interface of the present invention. The present invention is not limited to these examples, but is applicable to other existing and future-developed graphical user interfaces.

For example, with the graphical user interface of the present invention, a user can select a set 170 from first computer database 110. Set 170 has at least one object. In this example, set 170 comprises first object 111. Set 170 can be selected from a display of first computer database 110 in which set 170 is represented as a folder.

Figure 2:
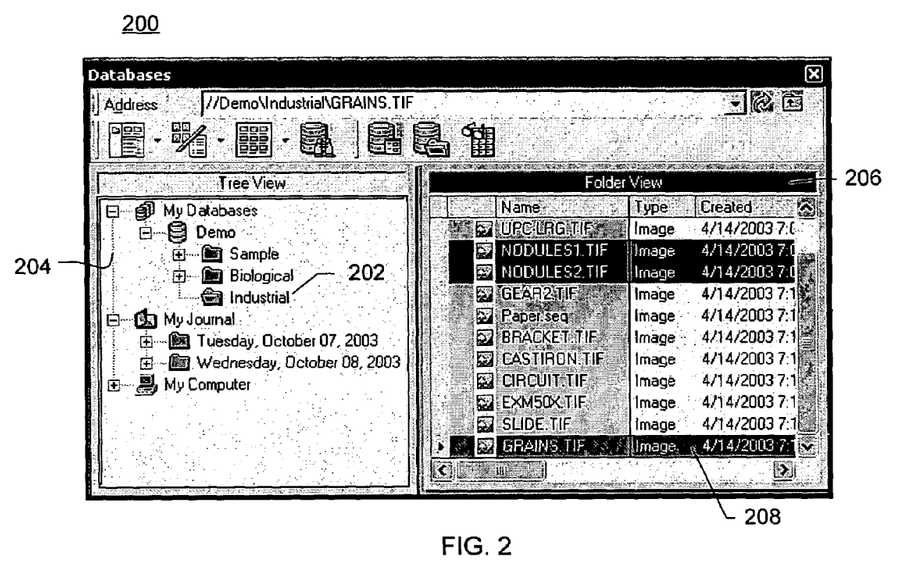
FIG. 2 shows a display 200 of first computer database 110 in which a set 170 is represented as a folder 202.

FIG. 2 shows a display 200 of first computer database 110 in which set 170 is represented as a folder 202. Folder 202 can be displayed in a hierarchical arrangement of folders 204. Set 170 can also be selected from a display of first computer database 110 in which set 170 is represented as a table 206. First object 111 of set 170 can be represented as a record 208 in table 206.

Figure 3:
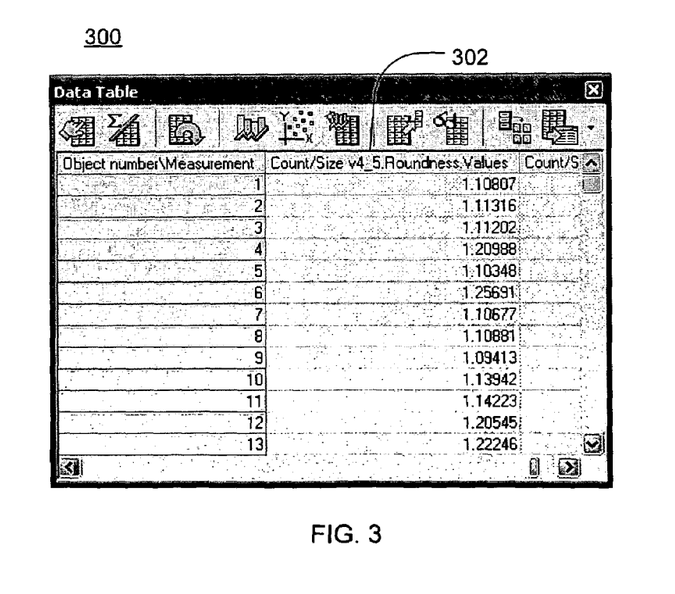
FIG. 3 shows a table 300 in which feature B 152 is represented as a field 302 in table 300.

A feature of the at least one object from first computer database 110 is selected with the graphical user interface. The feature can be characterized by a value. Optionally, the value is a measurement having units associated therewith. For example, if a subject on an image of the at least one object has a circular shape, the feature could be the subject and the value could be a measure of the diameter of the circular shape in a given unit system (e.g., metric or English units). The feature can be selected from a table in which the feature is represented as a field in the table. FIG. 3 shows a table 300 in which feature B 152 is represented as a field 302.

Figure 4A:
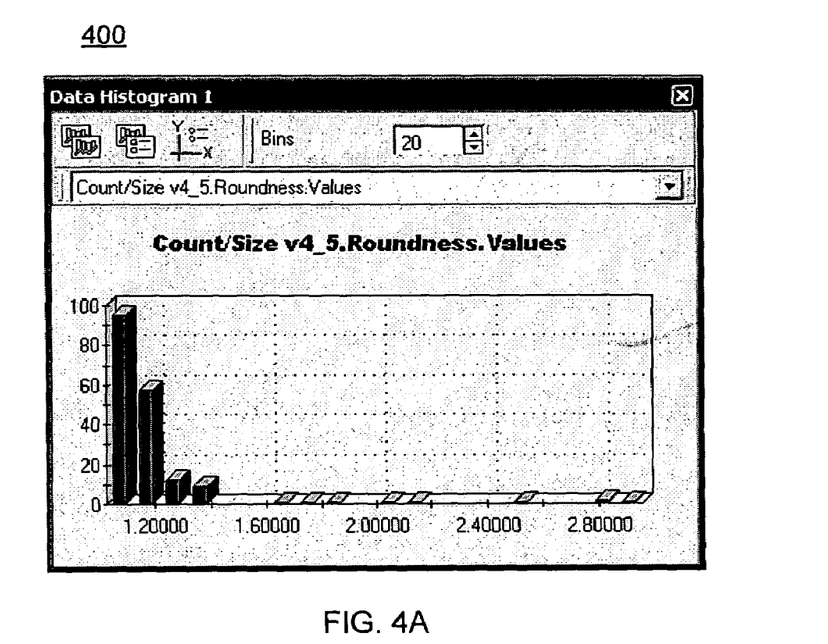
FIGS. 4A and 4B show a histogram 400 of feature B 152 from which a subrange of values can be selected.
Figure 4B:
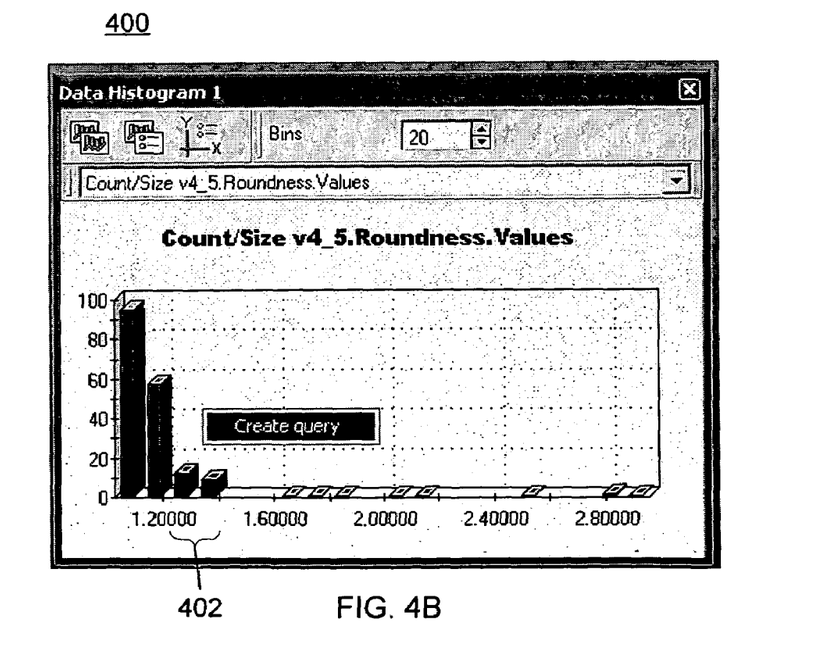

A subrange of values of feature B 152 is selected with the graphical user interface from a graph of a range of values of feature B 152. The graph can be a histogram, a scatter plot, or the like. FIG. 4A shows a histogram 400 of feature B 152. FIG. 4B shows histogram 400 with a subrange of values 402 of feature B 152 selected. In FIG. 4B, columns in histogram 400 that correspond to selected subrange of values 402 can be highlighted in a color or a pattern different from that used for the other columns, for example.

Figure 5:
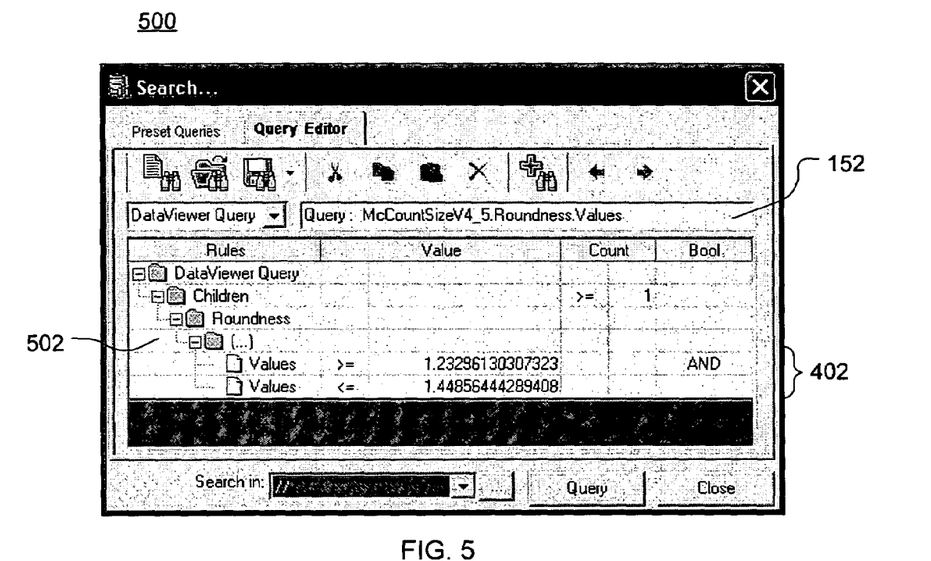
FIG. 5 shows a display 500 with a representation of the query 502.

The query is constructed so that it can identify object(s) from at least one of first computer database 110 and second computer database 120 if the value of feature B 152 of the object is within subrange of values 402. A representation of the query can be displayed. FIG. 5 shows a display 500 with a representation of the query 502. Representation 502 can have feature B 152 and subrange of values 402.

Figure 6:
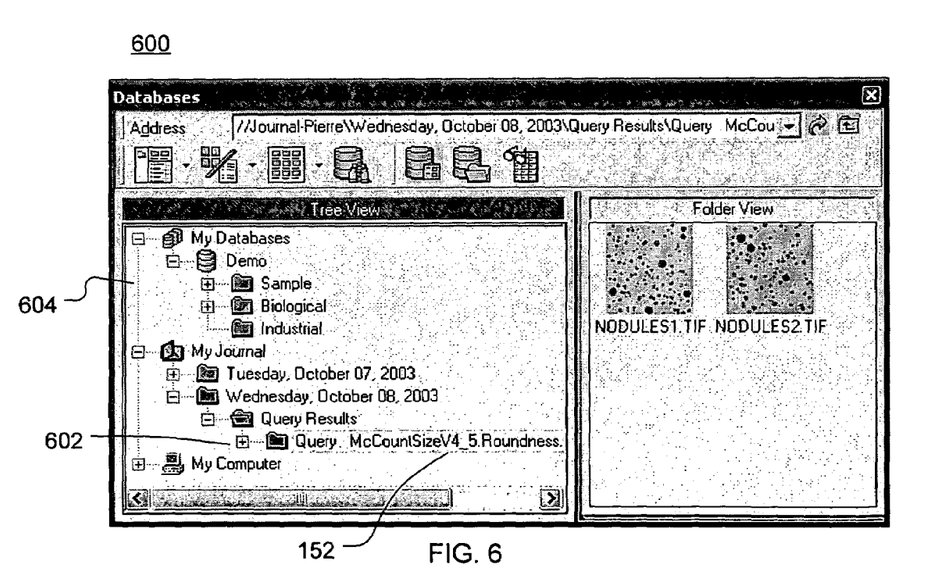
FIG. 6 shows a display 600 with the query represented as a folder 602.

Once constructed, the query can, optionally, be revised by changing values shown in display 500. Once constructed, the query can, optionally, be saved, executed, or both. The query can be saved as a new object in a computer database. The query object can be represented as a folder. FIG. 6 shows a display 600 with the query represented as a folder 602. Folder 602 can be identified by selected feature B 152. Folder 602 can be displayed in a hierarchical arrangement of folders 604.

If the query is executed, then the object(s) identified by the query can be displayed. The query can be executed to identify object(s) from first computer database 110, second computer database 120, or both if the value of feature B 152 of the object(s) is within subrange of values 402. In this example, the query identifies third object 121 and fourth object 122 from second computer database 120. Third object 121, fourth object 122, or both can be saved to first computer database 110. Alternatively, an address of a memory location in second computer database 120 in which third object 121, fourth object 122, or both are stored can be saved to first computer database 110. The object(s) or the address of the memory location in which the object(s) is stored can be saved as a new object in first computer database 110. The new object can be identified by selected feature B 152. The new object can be represented as folder 602. Folder 602 can be displayed in hierarchical arrangement of folders 604.

Using the graphical user interface of the present invention, the user can construct a complex query more quickly than it could be constructed using a character user interface. This is particularly advantageous in an environment in which substantial amounts of data need to be investigated in a short period of time. Furthermore, the graphical user interface of the present invention allows the user to construct the query even if the user has no knowledge of the query language(s) used by the underlying computer database(s).

Method

Figure 7:
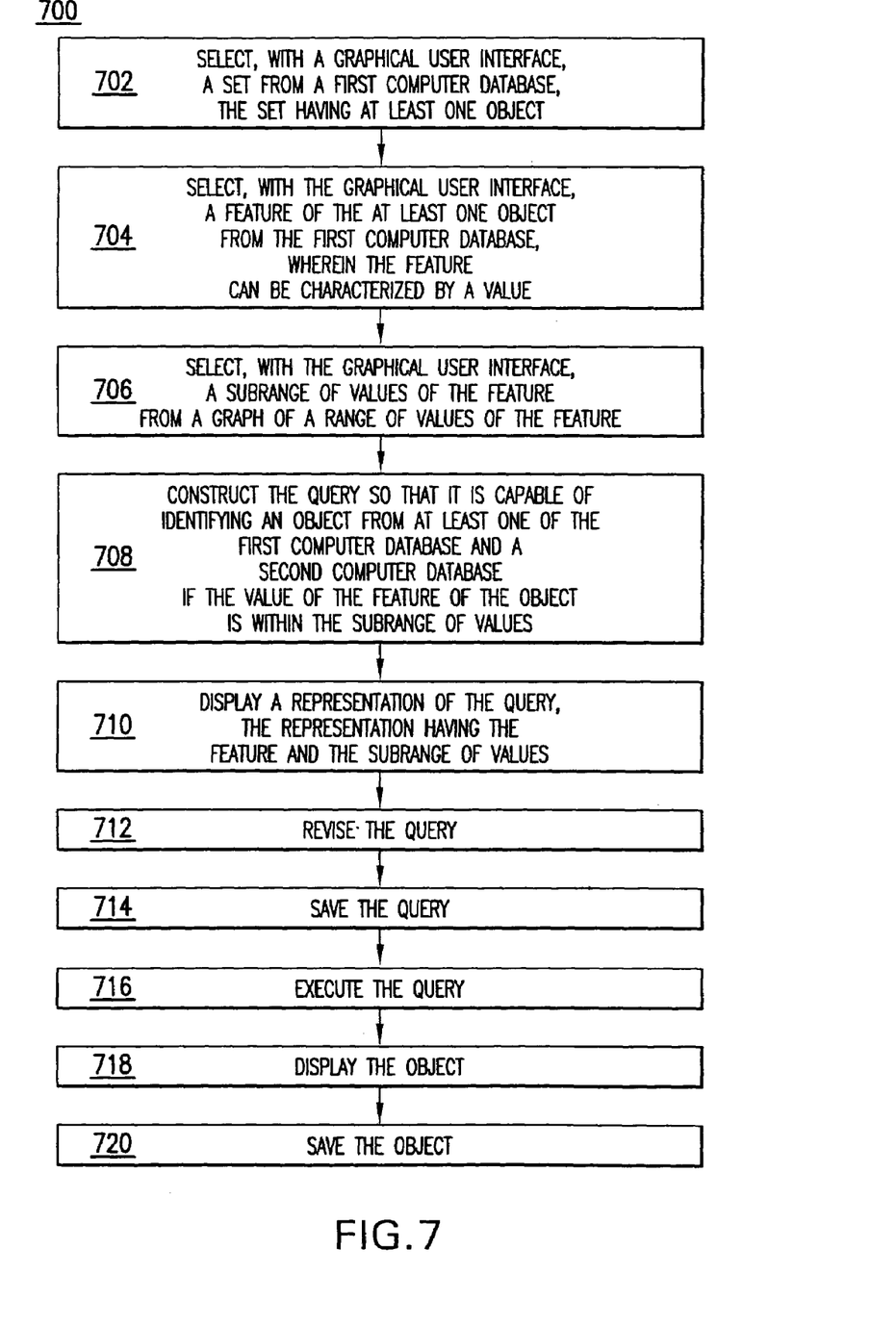
FIG. 7 shows a flow chart of a method 700 for constructing a query in the manner of the present invention.

FIG. 7 shows a flow chart of a method 700 for constructing a query in the manner of the present invention. Method 700 has several embodiments, which are differentiated below as optional steps. Method 700 can begin at optional step 702. At step 702, a set from a first computer database is selected with a graphical user interface. The set has at least one object. The set can be selected from a display of the first computer database in which the set is represented as a folder. The folder can be displayed in a hierarchical arrangement of folders. The set can be selected from a display of the first computer database in which the set is represented as a table. An object of the set can be represented as a record in the table.

At a step 704, a feature of the at least one object from the first computer database is selected with the graphical user interface. The feature can be characterized by a value. Optionally, the value is a measurement having units associated therewith. The feature can be selected from a table in which the feature is represented as a field in the table. At a step 706, a subrange of values of the feature is selected with the graphical user interface from a graph of a range of values of the feature. The graph can be a histogram, a scatter plot, or the like. At a step 708, the query is constructed so that it can identify an object from at least one of the first computer database and a second computer database if the value of the feature of the object is within the subrange of values. The object can be a file. The file can comprise an image. The file can further comprise a set of features related to the image, a user-defined feature related to the image, or both. The set of features, the user-defined feature, or both can include the selected feature.

Optionally, at a step 710, a representation of the query can be displayed. The representation can include the feature (selected at step 704) and the subrange of values (selected at step 706). Optionally, at a step 712, the query can be revised. In an embodiment, this can be accomplished using the graphical user interface. Optionally, at a step 714, the query can be saved. In an embodiment, the query can be saved as an object in a computer database.

Optionally, at a step 716, the query can be executed. If the query is executed, then, optionally, at a step 718, the object can be displayed. If the query is executed, then, optionally, at a step 720, the object can be saved. Alternatively, an address of a memory location in which the object is stored can be saved. The object or the address of the memory location in which the object is stored can be saved as a new object in a computer database. The new object can be a set of objects. The new object can be identified by the selected feature. The new object can be represented as a folder. The folder can be displayed in a hierarchical arrangement of folders.

System

Figure 8:
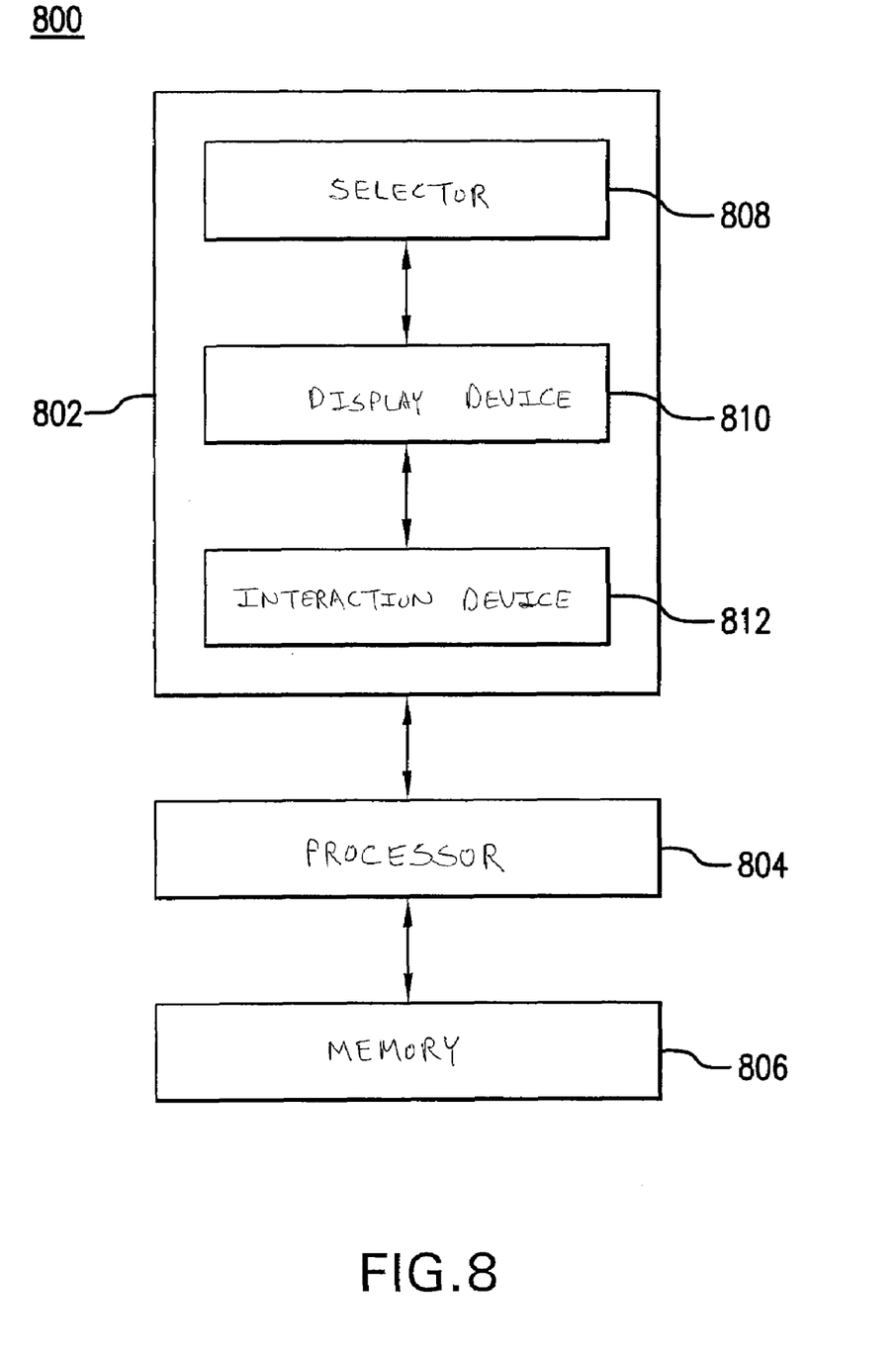
FIG. 8 is a block diagram of a system 800 for constructing a query in the manner of the present invention.

FIG. 8 is a block diagram of a system 800 for constructing a query in the manner of the present invention. System 800 comprises a graphical user interface 802, a processor 804, and a memory 806. Graphical user interface 802 comprises a selector 808 and a display device 810. Selector 808 allows a user to select a feature of at least one object from a first computer database. The feature can be characterized by a value. Optionally, the value is a measurement. Selector 808 allows the user to select a subrange of values of the feature from a graph of a range of values of the feature. The graph can be a histogram, a scatter plot, or the like. Display device 810 is coupled to selector 808. Display device 810 is configured to display the feature and the subrange of values. Processor 804 is coupled to graphical user interface 802. Processor 804 is configured to construct the query. The query can identify an object from at least one of the first computer database and a second computer database if the value of the feature of the object is within the subrange of values. The object can be a file. The file can comprise an image. Memory 806 is coupled to processor 804. Memory 806 can store the first computer database and the second computer database.

Graphical user interface 802 can further comprise an interaction device 812. Interaction device 812 can be coupled to selector 808. Interaction device 812 can allow the user to define a second feature related to the image. Interaction device 812 can also allow the user to revise the query.

Selector 808 can allow the user to select a set from the first computer database. The set has the at least one object. The set can be represented as a folder. The folder can be displayed in a hierarchical arrangement of folders. The set can be represented as a table. An object of the set can be represented as a record in the table. Selector 808 can also allow the user to select the feature from a table in which the feature is represented as a field in the table.

Display device 810 can display the set. Display device 810 can also display a representation of the query. The representation can have the feature and the subrange of values. Display device 810 can display the object.

Processor 804 can save the query to memory 806. Processor 804 can execute the query. Processor 804 can save the object to memory 806 or can save an address of a location in memory 806 in which the object is stored. The object can be a set of objects. The object can be identified by the feature. The object can be represented as a folder. The folder can be displayed in a hierarchical arrangement of folders.

Computer Program Product

In yet another embodiment, the present invention comprises a computer program product for constructing a query. The computer program product has computer program code means embodied in a computer useable medium. The computer program code means comprises a first computer program code means, a second computer program code means, and a third computer program code means.

The first program code means allows the user to select, with a graphical user interface, a feature of at least one object from a first computer database. The feature can be characterized by a value. The feature can be selected from a table in which the feature is represented as a field in the table. The computer program product can further comprise a fourth program means for allowing the user to define a second feature related to the image. The value can be a measurement having units associated therewith.

The second program code means allows the user to select, with the graphical user interface, a subrange of values of the feature from a graph of a range of values of the feature. The graphic can be a histogram, a scatter plot, or the like.

The third program code means causes a processor to construct the query. The query can identify an object from at least one of the first computer database and a second computer database if the value of the feature of the object is within the subrange of values. The object can be a file. The file can comprise an image. The file can further comprises a set of features related to the image.

The computer program product can further comprise a fourth program means for allowing the user to select, with the graphical user interface, a set from the first computer database. The set has the at least one object. The set can be represented as a folder. The folder can be displayed in a hierarchical arrangement of folders. The set can be represented as a table. An object of the set can be represented as a record in the table.

The computer program product can further comprise a fifth program means for displaying a representation of the query. The representation can have the feature and the subrange of values. The computer program product can further comprise a fourth program means for allowing the user to revise the query. The computer program product can further comprise a fourth program means for causing the processor to save the query to a memory.

The computer program product can further comprise a sixth program means for causing the processor to execute the query. The computer program product can further comprise a seventh program means for displaying the object. The computer program product can further comprise an eighth program means for causing the processor to save the object to a memory or to save an address of a location in the memory in which the object is stored. The object can be a set of objects. The object can be identified by the feature. The object can be represented as a folder. The folder can be displayed in a hierarchical arrangement of folders.

Environment of the Present Invention

Figure 9:
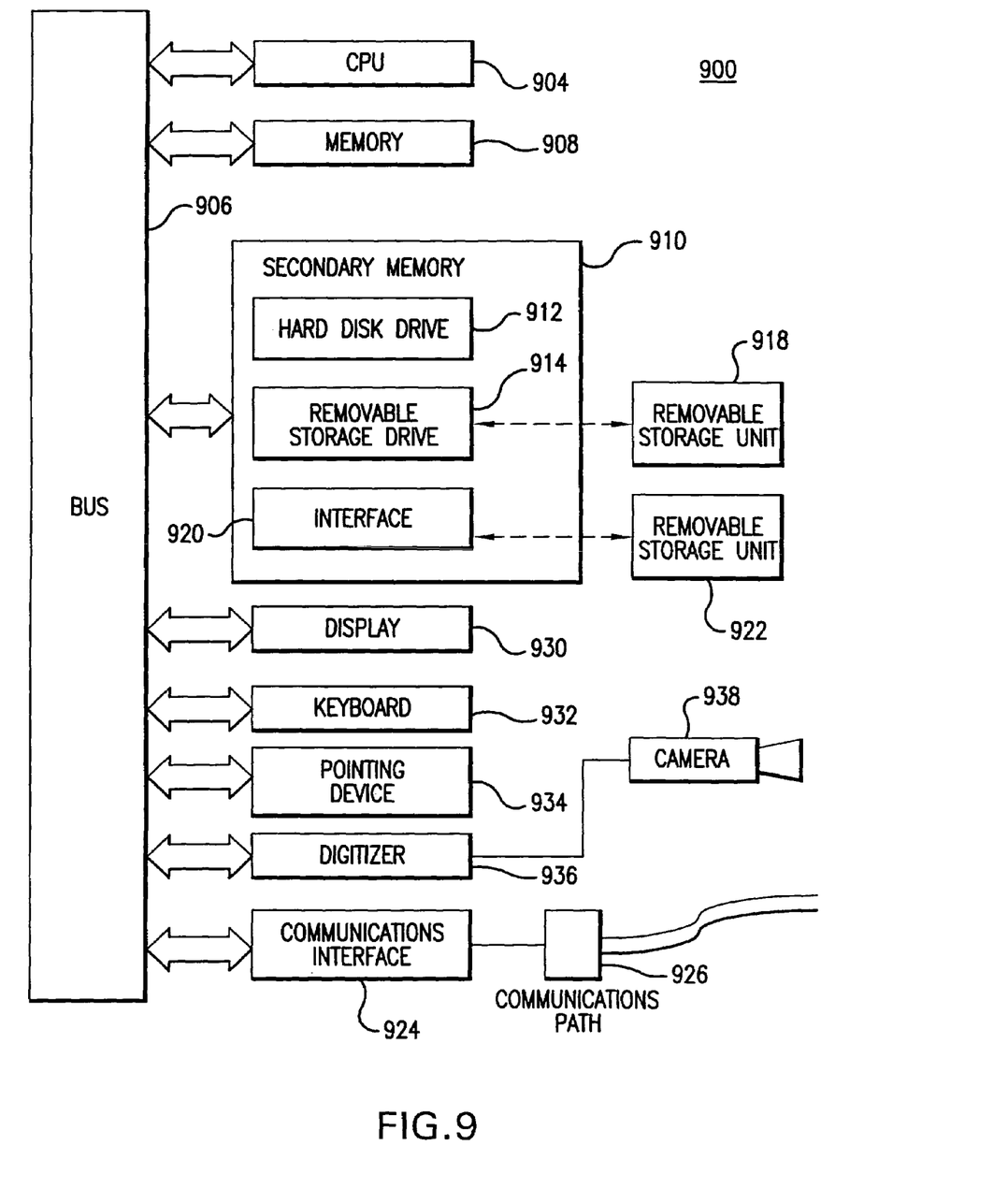
FIG. 9 is a block diagram of an example computer system 900 that can support an embodiment of the present invention.

FIG. 9 is a block diagram of an example computer system 900 that can support an embodiment of the present invention. Computer system 900 includes one or more processors, such as a central processing unit (CPU) 904. The CPU 904 is connected to a communications bus 906. Various software embodiments are described in terms of this example computer system. After reading this description, it will be apparent to a person skilled in the relevant art how to implement the present invention using other computer systems, computer architectures, or both.

Computer system 900 also includes a main memory 908, preferably random access memory (RAM), and can also include a secondary memory 910. The secondary memory 910 can include, for example, a hard disk drive 912 and/or a removable storage drive 914, representing a floppy disk drive, a magnetic tape drive, an optical disk drive, etc. The removable storage drive 914 reads from and/or writes to a removable storage unit 918 in a well-known manner. Removable storage unit 918 represents a floppy disk, magnetic tape, optical disk, etc., which is read by and written to removable storage drive 914. As will be appreciated, the removable storage unit 918 includes a computer usable storage medium having stored therein computer software, data, or both.

The computer system 900 also includes conventional hardware such as a display 930, a keyboard 932, and a pointing device 934. A digitizer 936 and a camera 938 can be used for capturing images to process according to the present invention. Alternatively, images can be retrieved from any of the above-mentioned memory units, or via a communications interface 924. In alternative embodiments, secondary memory 910 may include other similar means for allowing computer programs or other instructions to be loaded into computer system 900. Such means can include, for example, a removable storage unit 922 and an interface 920. Examples can include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

The communications interface 924 allows software and data to be transferred between computer system 900 and external devices via communications path 926. Examples of communications interface 924 can include a modem, a network interface (such as an Ethernet card), a communications port (e.g., RS-232), etc. Software and data transferred via communications interface 924 are in the form of signals which can be electronic, electromagnetic, optical or other signals that can be received by communications interface 924 via communications path 926. Note that communications interface 924 provides a means by which computer system 900 can interface to a network such as the Internet.

The present invention is described in terms of this example environment. Description in these terms is provided for convenience only. It is not intended that the invention be limited to application in this example environment. In fact, after reading the complete description, it will become apparent to a person skilled in the relevant art how to implement the present invention in alternative environments.

Software and Hardware Embodiments

The present invention is preferably implemented using software running (that is, executing) in an environment similar to that described above with respect to FIG. 9.

Computer programs (also called computer control logic) are stored in main memory and/or secondary memory 910. Computer programs can also be received via communications interface 924. Such computer programs, when executed, enable the computer system 900 to perform the features of the present invention as discussed herein. In particular, the computer programs, when executed, enable the processor 904 to perform the features of the present invention. Accordingly, such computer programs represent controllers of the computer system 900.

In an embodiment where the present invention is implemented using software, the software may be stored in a computer program product and loaded into computer system 900 using removable storage drive 914, hard drive 912 or communications interface 924. Alternatively, the computer program product may be downloaded to computer system 900 over communications path 926. The control logic (software), when executed by the processor 904, causes the processor 904 to perform the functions of the present invention as described herein.

In another embodiment, the present invention is implemented primarily in hardware using, for example, hardware components such as application specific integrated circuits (ASICs). Implementation of a hardware state machine so as to perform the functions described herein will be apparent to persons skilled in the relevant art(s).

CONCLUSION

The embodiments of the present invention as described herein with respect to FIGS. 1 through 9 can be implemented in software, firmware, hardware or a combination thereof. While various embodiments of the present invention have been described above, it should be understood that they have been presented by way of example, and not limitation. It will be apparent to persons skilled in the relevant art that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A computer-implemented method for constructing a query to locate at least one target image, comprising:
    extracting values of attributes of a plurality of features of images to provide extracted values for storing the images and the extracted values in a database, wherein the extracted values of a selected attribute are characterized by a range having a plurality of subranges;
    providing a graphical representation having a plurality of representation portions wherein each representation portion corresponds respectively to a subrange of the plurality of subranges of the extracted values of the selected attribute;
    selecting a representation portion to provide a selected representation portion;
    selecting a subrange of the plurality of subranges of the extracted values of the selected attribute corresponding to the selected representation portion to provide a selected subrange;
    constructing the query in accordance with the selected subrange to provide a complex query; and
    identifying the at least one target image in accordance with the complex query, whereby the at least one target image is identified in accordance with the selected subrange of the extracted values of the selected attribute.

2. The method of claim 1, wherein the extracting comprises selecting, with a GUI, the extracted value of at least one object from the database from a table in which the extracted value is represented as a field in the table, wherein the extracted value is characterized by the value.

3. The method of claim 1, further comprising providing a representation of the complex query and selecting, with a GUI, a set from the database, the set having at least one object.

4. The method of claim 3, wherein the providing a representation of the complex query comprises selecting, with the GUI, the set from the database from a display of the database in which the set is represented as a folder, the set having the at least one object.

5. The method of claim 3, wherein the providing a representation of the complex query comprises selecting, with the GUI, the set from the database from a display of the database in which the set is represented as a table, the set having the at least one object.

6. The method of claim 1, wherein a representation of the complex query has the extracted value and the subrange of values.

7. The method of claim 1, further comprising saving the complex query.

8. The method of claim 1, further comprising executing the complex query.

9. The method of claim 8, further comprising displaying the object.

10. The method of claim 8, further comprising saving the object.

11. The method of claim 1, wherein the extracting comprises performing thresholding.

12. The method of claim 1, wherein the extracting comprises performing adaptive filtering.

13. The method of claim 1, wherein the extracting comprises performing background subtraction.

14. The method of claim 1, wherein the extracting comprises performing image feature counting.

15. The method of claim 1, wherein the extracting comprises extracting file signature information.

16. The method of claim 1, wherein the extracting comprises extracting image thumbnail information.

17. The method of claim 1, wherein the extracting comprises extracting roundness information.

18. The method of claim 1, wherein the extracting comprises extracting image grain sizing information.

19. The method of claim 1, further comprising manually adjusting the displayed complex query by the user to provide a manually adjusted complex query.

20. The method of claim 19, further comprising identifying the target object in accordance with the manually adjusted complex query independently of any further image analysis.

21. The method of claim 1, wherein the selected subrange has a first value and a second value, the range of values has a third value and a fourth value, the fourth value is different from each of the third value, the second value, and the first value, the third value is different from each of the second value and the first value, and the second value is different from the first value.

22. A computer-implemented method for constructing a query to locate at least one target image, comprising:
   extracting values of attributes of a plurality of features of images using computer processed algorithms to provide extracted values for storing the images and the extracted values in a database, wherein the extracted values of an attribute are characterized by a range having a plurality of subranges;
   selecting a subrange of values of a selected attribute from a graph of the subranges of the values of the selected attribute to provide a selected subrange;
   constructing the query in accordance with the selected subrange to provide a complex query;
   identifying the at least one target image in accordance with the complex query, whereby the at least one target image is identified in accordance with the extracted values of the selected attribute; and
   wherein the selected subrange has a first value and a second value, the range of values has a third value and a fourth value, the fourth value is different from each of the third value, the second value, and the first value, the third value is different from each of the second value and the first value, and the second value is different from the first value.

23. The method of claim 22, further comprising selecting a set from the database, the set having at least one object.

24. The method of claim 23, wherein the extracting comprises selecting an extracted value of the at least one object from the database from a table in which the extracted value is represented as a field in the table, wherein the extracted value is characterized by the value.

25. The method of claim 24, further comprising presenting a representation of the complex query and selecting the set from the database from a display of the database in which the set is represented as a folder, the set having the at least one object.

26. The method of claim 24, further comprising presenting a representation of the complex query and selecting the set from the database from a display of the database in which the set is represented as a table, the set having the at least one object.

27. The method of claim 22, wherein a representation of the complex query has the extracted value and the subrange of values.

28. The method of claim 22, further comprising saving the complex query.

29. The method of claim 22, further comprising executing the complex query.

30. The method of claim 22, further comprising displaying the complex query.

31. The method of claim 30, further comprising manually adjusting the displayed complex query by the user to provide a manually adjusted complex query.

32. The method of claim 31, further comprising identifying the target object in accordance with the manually adjusted complex query independently of any further image analysis.

* * * * *